(12) United States Patent
Tulloch et al.

(10) Patent No.: US 11,524,791 B2
(45) Date of Patent: Dec. 13, 2022

(54) INTERFACES BETWEEN COMPONENTS

(71) Applicant: Airbus Operations Limited, Bristol (GB)

(72) Inventors: William Tulloch, Bristol (GB); Pat Broomfield, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 226 days.

(21) Appl. No.: 16/780,146

(22) Filed: Feb. 3, 2020

(65) Prior Publication Data

US 2020/0277068 A1  Sep. 3, 2020

(30) Foreign Application Priority Data

Feb. 4, 2019 (GB) ...................... 1901489

(51) Int. Cl.
*B64C 27/26* (2006.01)
*B64D 27/26* (2006.01)
*B64F 5/10* (2017.01)

(52) U.S. Cl.
CPC .............. *B64D 27/26* (2013.01); *B64F 5/10* (2017.01); *B64D 2027/264* (2013.01)

(58) Field of Classification Search
CPC .............. B64D 27/26; B64D 2027/264; B64D 2027/262; B64D 27/18; B64D 2027/266; B64D 47/00; B64F 5/10; F16B 5/025; F16B 2001/0035; F16B 43/02; B64C 3/32
See application file for complete search history.

(56) References Cited

U.S. PATENT DOCUMENTS

| | | | | |
|---|---|---|---|---|
| 4,624,435 A | * | 11/1986 | Freudenberg | F16F 15/03 180/300 |
| 5,039,047 A | * | 8/1991 | Pitzo | A47G 1/17 248/467 |
| 5,174,552 A | * | 12/1992 | Hodgson | B64D 27/26 188/282.3 |
| 2007/0051576 A1 | * | 3/2007 | Shimoda | F16F 15/073 188/380 |

(Continued)

FOREIGN PATENT DOCUMENTS

| | | |
|---|---|---|
| CN | 106882391 | 6/2017 |
| DE | 198 47 974 A1 | 5/2000 |

(Continued)

OTHER PUBLICATIONS

Extended European Search Report for European Application No. 20151675.4, 13 pages, dated Jul. 6, 2020.

(Continued)

*Primary Examiner* — Medhat Badawi
(74) *Attorney, Agent, or Firm* — Nixon & Vanderhye P.C.

(57) ABSTRACT

An assembly is disclosed including a first component, a second component, and a spacer component. The first component has a first interface surface. The second component has a second interface surface with a curvature different to the curvature of the first interface surface. The second component is connected to the first component such that the second interface surfaces faces the first interface surface. The spacer component is disposed between the first interface surface and the second interface surface and is configured to be pivotable relative to the first interface surface.

14 Claims, 4 Drawing Sheets

(56) References Cited

U.S. PATENT DOCUMENTS

| | | | | |
|---|---|---|---|---|
| 2010/0147996 A1* | 6/2010 | Hartshorn | ............... | B64D 27/18 244/54 |
| 2014/0183297 A1* | 7/2014 | Brochard | ............... | B64D 27/26 244/54 |
| 2015/0167777 A1* | 6/2015 | Hull | ............... | B64C 1/14 267/141 |
| 2015/0252864 A1* | 9/2015 | Hull | ............... | F16F 7/1011 188/267 |
| 2015/0266561 A1* | 9/2015 | Hariram | ............... | B64C 1/066 49/506 |
| 2015/0322979 A1* | 11/2015 | Giacalone | ............... | B64D 11/00 24/292 |
| 2015/0322980 A1* | 11/2015 | Giacalone | ............... | H01F 7/0252 24/292 |
| 2016/0244178 A1* | 8/2016 | Bonner | ............... | F02C 7/20 |
| 2016/0363253 A1* | 12/2016 | Kilgore | ............... | F16M 11/16 |
| 2016/0363262 A1* | 12/2016 | Moelmann | ............... | F16B 1/00 |
| 2019/0031335 A1* | 1/2019 | McCullough | ............... | B64C 39/024 |
| 2019/0055027 A1* | 2/2019 | Martin | ............... | B64D 27/26 |
| 2019/0168883 A1* | 6/2019 | Buchholz | ............... | B64C 1/16 |
| 2020/0031482 A1* | 1/2020 | Deforet | ............... | B64D 27/26 |
| 2020/0277068 A1* | 9/2020 | Tulloch | ............... | B64F 5/10 |

FOREIGN PATENT DOCUMENTS

| | | |
|---|---|---|
| EP | 2896561 | 7/2015 |
| FR | 2 963 608 | 2/2012 |
| WO | 2018/192787 | 10/2018 |

OTHER PUBLICATIONS

Examination Report for European Application No. 20151675.4, six pages, dated Jun. 8, 2021.

Combined Search and Examination Report for GB 1901489.3, dated Jul. 19, 2019, 8 pages.

* cited by examiner

INTERFACES BETWEEN COMPONENTS

CROSS RELATED APPLICATION

This application claims priority to United Kingdom (GB) Patent Application 1901489.3, filed Feb. 4, 2019, the entire contents of which is hereby incorporated by reference.

TECHNICAL FIELD

The present invention relates to an assembly of two connected components, to a kit of parts for forming such an assembly, to an aircraft comprising such an assembly, and to a method of forming such an assembly.

BACKGROUND

Most conventional aircraft have engines mounted to the wings by engine mounting pylons. For commercial airliners there is a trend toward higher bypass ratio engines, which have larger diameters than lower bypass ratio engines. To accommodate large diameter engines whilst maintaining sufficient clearance between the engine and the ground it is desirable to minimize the vertical distance between the top of the engine and the lower surface of the wing.

In order to minimize the vertical distance between the top of the engine and the lower surface of the wing, it is desirable to attach the engine mounting pylon directly to the wing. However; the lower surface of the wing is curved, due to the aerofoil shape whilst the upper surface of an engine mounting pylon is typically substantially flat (planar). The upper surface of the engine mounting pylon will therefore only abut the lower surface of the wing over a relatively small area. In order to allow fastening together of the pylon and the wing, and effective load transmission therebetween, it is therefore desirable to provide some sort of interface component to fill the gaps between the upper surface of the pylon and the lower surface of the wing, at least in the locations where fasteners joining the pylon and wing are present.

SUMMARY

A first aspect of the present invention provides an assembly comprising a first component, a second component and a spacer component. The first component has a first interface surface. The second component has a second interface surface with a curvature different to the curvature of the first interface surface. The second component is connected to the first component such that the second interface surfaces faces the first interface surface. The spacer component is disposed between the first interface surface and the second interface surface and is configured to be pivotable relative to the first interface surface.

Optionally, the spacer component is configured to be pivotable about at least two orthogonal axes relative to the first interface surface.

Optionally, the spacer component has a convex part-spherical surface in contact with a region on the first interface surface.

Optionally, the region on the first interface surface is concave part-spherical and is configured to match the convex part-spherical surface of the spacer component.

Optionally, the first interface surface is curved and the second interface surface is substantially flat, and the spacer component has a substantially flat surface in contact with a region on the second interface surface.

Optionally, the assembly further comprises an attachment mechanism configured to retain the spacer component in contact with the first interface surface in the absence of any other retaining mechanism.

Optionally, the attachment mechanism comprises a magnetic attachment mechanism, and one of the first component and the spacer component comprises a magnet and the other one of the first component and the spacer component comprises a ferromagnetic material, such that an attractive magnetic force exists between the first component and the spacer component.

Optionally, the magnet and/or the ferromagnetic material is configured such that the magnetic force is strong enough to retain the spacer component in contact with the first interface surface in the absence of any other retaining mechanism.

Optionally, a region of the first interface surface in contact with the spacer component comprises a magnet or a ferromagnetic material, and at least one further region of the first interface surface comprises a non-magnetic material.

Optionally, the first component is connected to the second component by at least one fastener, and the fastener extends through the spacer component.

Optionally, the fastener comprises a tension bolt.

Optionally, the assembly comprises a further spacer component disposed between the first interface surface and the second interface surface.

Optionally, the first spacer component and the second spacer component have substantially the same shape, but different thicknesses.

Optionally, the assembly further comprises a third component connected to the second component such that the first component is between the third component and the second component, wherein the first component comprises an interface plate having a further surface opposite to the first interface surface, the further surface being configured to match a surface of the third component which faces the first component.

Optionally, the third component is comprised in a first aircraft structure and the second component is comprised in a second aircraft structure.

Optionally, the first aircraft structure is a wing and the second aircraft structure is an engine mounting pylon.

A second aspect of the invention provides an aircraft comprising the assembly of the first aspect.

A third aspect of the invention provides a kit of parts for forming a joint. The kit of parts comprises:
 a first structure having a first surface;
 a second structure having a second surface, wherein the shape of the second surface does not match the shape of the first surface; and
 at least one intermediary element having a first side configured to contact the first surface and a second side configured to contact the second surface, wherein the first side of the intermediary element and/or the first surface is configured such that relative pivoting of the intermediary element and the first structure is permitted.

Optionally, the second side of the intermediary element and/or the second surface is configured such that relative pivoting of the intermediary element and the second structure about any axis parallel to the second surface is substantially prevented.

Optionally, the kit of parts comprises a plurality of intermediary elements, each having a first side configured to contact the first surface and a second side configured to contact the second surface, wherein the first side of each intermediary element and/or the first surface is configured such that relative pivoting of each intermediary element and the first structure is permitted, and wherein a distance between the first side and the second is different for each intermediary element.

Optionally, the kit of parts is for forming an assembly according to the first aspect, and the first structure comprises a first component according to the first aspect, the second structure comprises a second component according to the first aspect, and the intermediary element comprises a spacer component according to the first aspect.

A fourth aspect of the invention provides a method of joining a first component to a second component in a predetermined relative position and orientation of the first and second components. The method comprises:

providing a first component having a first interface surface;
providing a second component having a second interface surface, wherein the curvature of the second interface surface is different to the curvature of the first interface surface;
measuring the configuration of the first interface surface and the configuration of the second interface surface;
determining the configuration of at least one gap between the first interface surface and the second interface surface when the first component and the second component are arranged in a desired relative position and orientation, based on the results of the measuring;
selecting at least one spacer component from a plurality of differently sized spacer components, based on the results of the determining;
arranging and retaining the at least one spacer component on the first component such that a first surface of the spacer component is in contact with the first interface surface;
pivoting the at least one spacer component until a second surface of the spacer component opposite the first surface is aligned with the second interface surface when the second component is in the desired position and orientation;
arranging the second component on the at least one spacer component such that the first component and the second component are in the desired relative position and orientation, the spacer component is in the at least one gap, and the spacer component is in contact with the first interface surface and the second interface surface; and
connecting the first component to the second component.

Optionally, performance of the method results in the formation of an assembly according to the first aspect.

BRIEF DESCRIPTION OF THE DRAWINGS

Embodiments of the invention will now be described, by way of example only, with reference to the accompanying drawings, in which:

FIG. 5b is a schematic cross-section through of one of the spacer components comprised in the assembly of FIG. 5a;

DETAILED DESCRIPTION

The examples described below relate to assemblies of a first component connected to a second component. In each example assembly, the first component has a first interface surface and the second component has a second interface surface with a curvature different to the curvature of the first interface surface. Furthermore, the second component is connected to the first component such that the second interface surfaces faces the first interface surface. Each example assembly further comprises a spacer component disposed between the first interface surface and the second interface surface, and configured to be pivotable relative to the first interface surface.

Example assemblies according to the invention may be comprised in joints between aircraft wings and aircraft engine mounting pylons. An engine mounting pylon may generally be attached to a wing box by a forward coupling and an aft coupling. The example assemblies according to the invention may be especially suitable for use in forward couplings between engine mounting pylons and wing boxes. The forward coupling between an engine mounting pylon and a wing box supports the weight of the pylon and transmits thrust from the engine to the wing.

As discussed above, the surfaces of a wing and an engine mounting pylon which lie adjacent each other at the joint between the wing and pylon generally have different curvature—the wing is curved whilst the top of the pylon is typically flat. Conventionally, this issue has been addressed by providing one or more interface plates between the wing and pylon, which are shaped to exactly match the lower surface of the wing and the upper surface of the pylon (and thus to exactly fill a gap therebetween).

However; creating such interface plates is time-consuming, and can be difficult if the material needs to be highly wear resistant (which it generally does for a wing-pylon joint, or any other joint which must transmit high loads during operation). To ensure that the joint performs well for a reasonable length of time, the shape of the interface plates must be carefully controlled to closely match the shapes of the surface that it is intended to contact. The final shape of the wing lower surface cannot be determined until the late stages of manufacturing the wing, due to the build-up of manufacturing tolerances. For this reason, conventional interface plates are typically machined in-situ once the wing build is substantially complete.

The example assemblies according to the invention seek to address these issues, and thereby enable more time and cost-efficient processes for forming joints between surfaces of differing curvature. The example assemblies according to the invention are especially suitable for use in high-load joints, such as joints between aircraft engine mounting pylons and aircraft wings. In particular, by virtue of a spacer component according to the invention being pivotable relative to the first interface surface, the spacer component can self-align to the second interface surface during a process of connecting the second component to the first component. A good contact is thereby ensured between the spacer component and the second interface surface and between the spacer component and the first interface surface, without needing to tailor the shape of the spacer component to match the first interface surface.

Figure 1:
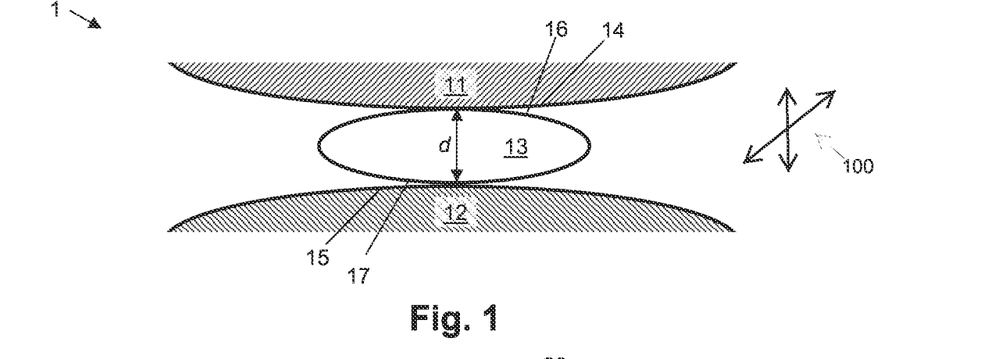
FIG. 1 is a schematic cross-section through an example assembly according to the invention.

FIG. 1 is a cross-section through an example assembly 1 according to the invention. The assembly 1 comprises a first component 11 and a second component 12. The first component 11 has a first interface surface 14 and the second component 12 has a second interface surface 15. The curvature of the second interface surface 15 is different to the curvature of the first interface surface 14. In this particular example, the second interface surface 15 curves downwardly (with respect to the orientation shown in FIG. 1) and the first interface surface 14 curves upwardly. The magnitude of the curvature of the first and second interface surfaces 14, 15 is substantially the same, but this need not be the case in other examples. In some examples the first component 11 and the second component 12 are each aircraft components. The second component 12 is connected to the first component 11 such that the second interface surface 15 faces the first interface surface 14. The connection mechanism is not shown in FIG. 1 but may comprise, for example, a fastener extending through the first component 11 and the second component 12.

A spacer component 13 is disposed between the first interface surface 14 and the second interface surface 15. In examples where the first and second components 11, 12, are connected by a fastener, the fastener may extend through the spacer component 13 (this type of fastener arrangement is described below with reference to FIG. 6). The spacer component 13 has an upper surface 16 which is in contact with the first interface surface 14, and a lower surface 17 which is in contact with the second interface surface 15.

The spacer component 13 is configured to be pivotable relative to the first interface surface 14. Pivoting of the spacer component 13 relative to the first interface surface 14 is enabled by the upper surface 16 of the spacer component 13 being curved. The direction of curvature of the upper surface 16 may be inverse to the direction of curvature of the first interface surface 14. In some examples, the spacer component 13 is configured to be pivotable relative to the first interface surface 14 about a single axis which is oriented parallel to the first interface surface 14. In such examples, the upper surface 16 is part-cylindrical. A spacer component having this configuration is suitable for applications where the first interface surface is curved about just one axis. The spacer component should be arranged in the assembly 1 such that the axis of curvature of the upper surface 16 of the spacer component 13 is parallel to the axis of curvature of the first interface surface 14. In other examples the spacer component 13 is configured to be pivotable relative to the first interface surface 14 about at least two orthogonal axes 100. In such examples the upper surface 16 is part-spherical. A spacer component having this configuration is suitable for applications where the first interface surface 14 is curved about more than one axis.

In the particular example, the spacer component 13 is additionally pivotable relative to the second interface surface 15. It is advantageous for the spacer component 13 to be pivotable relative to the second interface surface 15 in applications where the second interface surface 15 is curved. Pivoting of the spacer component 13 relative to the second interface surface 15 is enabled by the lower surface 17 of the spacer component 13 being curved. The direction of curvature of the lower surface 17 may be inverse to the direction of curvature of the second interface surface 15. In some examples, the spacer component 13 is configured to be pivotable relative to the second interface surface 15 about a single axis which is oriented parallel to the second interface surface 15. In such examples, the lower surface 17 is part-cylindrical. A spacer component having this configuration is suitable for applications where the second interface surface 15 is curved about just one axis. The spacer component 13 should be arranged in the assembly 1 such that the axis of curvature of the lower surface 17 of the spacer component 13 is parallel to the axis of curvature of the second interface surface 15. In other examples the spacer component 13 is configured to be pivotable about at least two orthogonal axes relative to the second interface surface 15. In such examples the lower surface 17 is part-spherical. A spacer component having this configuration is suitable for applications where the second interface surface 15 is curved about more than one axis. The second interface surface 15 may be (but need not be) a mirror image of the first interface surface 14.

The spacer component 13 has a thickness d, which is the maximum distance between its upper surface 16 and its lower surface 17. The thickness d of the spacer component 13 may be selected in dependence on the shape of the first interface surface 14 and/or on the shape of the second interface surface 15 and/or on the width of a desired gap between the first interface surface 14 and the second interface surface 15. A process for selecting the thickness of a spacer component will be explained in more detail in relation to FIG. 9.

The spacer component 13 may be formed from any suitable material. The spacer component 13 is preferably rigid and non-compressible. At least regions of the surface of the spacer component 13 which are in contact with the first interface surface 14 and the second interface surface 15 may be formed from a wear-resistant material such as titanium or stainless steel. If the assembly 1 is intended for an aerospace application, the material(s) of the spacer component 13 may be selected to be as light as possible whilst still providing the necessary mechanical and wear properties. In some examples, the upper surface 16 of the spacer component may be configured to enable sliding contact with the first interface surface 14 to facilitate pivoting of the spacer component 13 relative to the first interface surface 14, and/or the lower surface 17 of the spacer component 13 may be configured to enable sliding contact with the second interface surface 15 to facilitate pivoting of the spacer component 13 relative to the second interface surface 15. For example, the upper surface 16 and/or the lower surface 17 may comprise a low-friction coating or surface finish.

Figure 2:
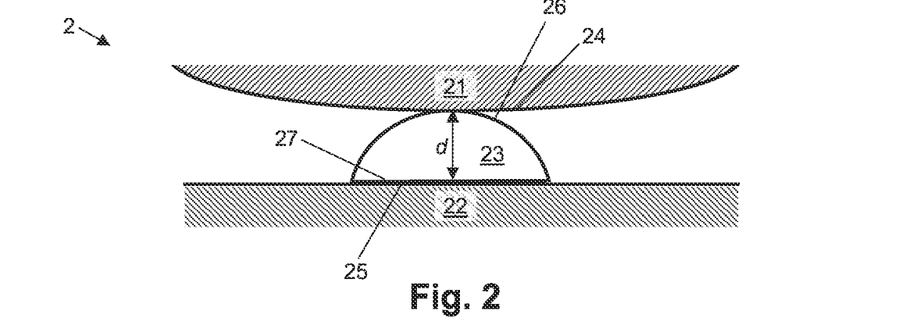
FIG. 2 is a schematic cross-section through a further example assembly according to the invention.

FIG. 2 is a cross-section through a second example assembly 2 according to the invention. The assembly 2 comprises a first component 21 having a first interface surface 24, a second component 22 having a second interface surface 25, and a spacer component 23. The elements of the second example assembly 2 are substantially the same as the corresponding elements of the example assembly 1, except for the differences that are explicitly described below.

Unlike the second interface surface 15 of the example assembly 1, the second interface surface 25 of the example assembly 2 is substantially flat. The lower surface of the spacer component 23 is shaped to match the second interface surface 25, and is therefore also substantially flat. The entire lower surface of the spacer component 23 is in contact with the second interface surface 25. The lower surface of the spacer component 23 is in contact with a region of the second interface surface 25 which is the same shape and size as the lower surface of the spacer component 23. A consequence of the lower surface of the spacer component 23 being substantially flat and the second interface surface 25 being substantially flat is that the spacer component 23 is prevented from pivoting relative to the second component 22, about any axis parallel to the second interface surface 25. A further consequence is that the lower surface 27 of the spacer component 23 is in contact with the second interface surface 25 across the whole area of the lower surface 27, which may be advantageous for transferring load between the second component 22 and the spacer component 23.

An assembly having this configuration may find application where it is desired to join a flat surfaced component to a curved surfaced component, and particularly where the exact configuration of the curved surface cannot be known in advance of a process of forming the assembly. In some examples the first component may be comprised in an aircraft wing, and the second component may be comprised in an aircraft engine mounting pylon.

Figure 3A:
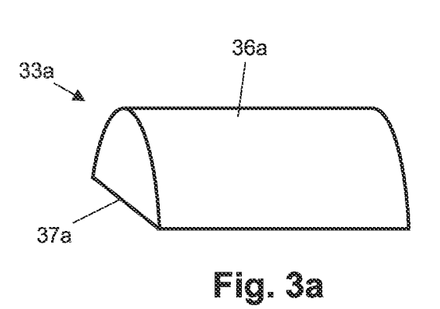
FIGS. 3a and 3b are schematic perspective views of example spacer components for the assembly of FIG. 2.
Figure 3B:
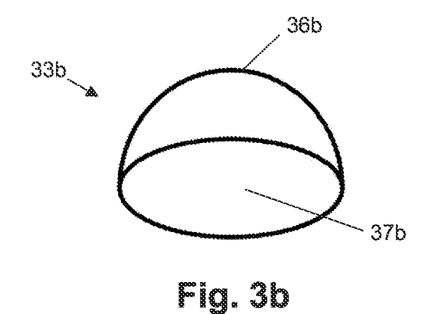

FIGS. 3a and 3b are perspective views of two example spacer components 33a, 33b, which could be used as the spacer component 23 of the example assembly 2. The spacer component 33a has a part cylindrical upper surface, and is therefore pivotable about one axis (the long axis of the cylinder) relative to the first interface surface 24. The spacer component 33a is therefore suitable for applications where the first interface surface 24 is curved about only one axis. The spacer component 33b has a part spherical upper surface, and is therefore pivotable about any axis relative to the first interface surface 24. The spacer component 33b is therefore suitable for applications where the first interface surface 24 is curved about more than one axis.

Figure 4:
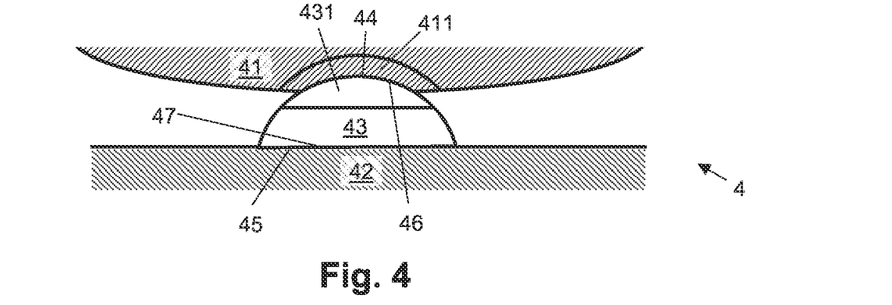
FIG. 4 is a schematic cross-section through a further example assembly according to the invention.

FIG. 4 is a cross-section through a third example assembly 4 according to the invention. The assembly 4 comprises a first component 41 having a first interface surface 44, a second component 42 having a second interface surface 45, and a spacer component 43. The elements of the third example assembly 4 are substantially the same as the corresponding elements of the example assembly 2, except for the differences that are explicitly described below.

The region of the first interface surface 44 that is in contact with the upper surface of the spacer component 43 is convex part-spherical—in other words, it comprises a recess. The recess is configured to match the upper surface of the spacer component, such that the entire surface of the recess is in contact with the upper surface of the spacer component 43. The provision of such a recess may be advantageous in maintaining the spacer component 43 in a desired position on the first component 41. The provision of such a recess also means that the area of contact between the spacer component 43 and the first component 41 is significantly greater than if no recess is present (as is the case for the example assemblies 1 and 2). This greater contact area facilitates the transmission of loads between the spacer component 43 and the first component 41. Providing a recess in the first interface surface 44 is therefore particularly advantageous for high-load applications. In examples where both the upper and lower surfaces of the spacer component are part-spherical (such as the example assembly 1) a similar recess may also be provided in the second interface surface. Similar recesses may be provided on the first and/or second interface surfaces of any example assemblies according to the invention, including the example assemblies 1, 2, 5 and 6 described herein.

The assembly 4 comprises an attachment mechanism configured to retain the spacer component 43 in contact with the first interface surface 44 in the absence of any other retaining mechanism. That is, if the spacer component 43 and first component 41 are in the arrangement shown in FIG. 4, with the spacer component below the first component 41, the spacer component 43 is retained in this position by the attachment mechanism even if the second component 42 is not present to support the spacer component 43. The attachment mechanism is also configured to permit relative pivoting of the spacer component 43 and the first component 41. In the particular example of FIG. 4, the attachment mechanism comprises a magnetic attachment mechanism, as will be further described below. However; any other suitable attachment mechanism may alternatively be provided, such as an adhesive substance in the contact region between the spacer component 43 and the first interface surface 44, or a mechanical attachment mechanism such as springs or elastic members connecting the spacer component 43 to the first component 41.

The spacer component 43 comprises a magnet 431. In the illustrated example, the magnet 431 forms the portion of the spacer component 43 which is adjacent to the first component 41. However; in other examples the magnet 431 may comprise the entire spacer component, or may comprise a different part of the spacer component. The magnet 431 comprises a portion of permanent magnetic material. The permanent magnetic material may be a magnetized ferromagnetic or ferrimagnetic material. The first component 41 comprises a ferromagnetic material 411, which need not be magnetized. The ferromagnetic material 411 forms part of the first interface surface 44. In the illustrated example the ferromagnetic material 411 is configured such that it lines the recess in the first interface surface 44. The magnet 431 is in contact with the ferromagnetic material 411. In alternative examples the magnet may be comprised in the first component 41 and the ferromagnetic material may be comprised in the spacer component 43. In some examples the magnet 431 and or the ferromagnetic material 411 may be covered by a coating layer, for example to improve the wear-resistance of the exposed surface of the magnet/ferromagnetic material.

An attractive magnetic force exists between the magnet 431 and the ferromagnetic material 411, and therefore an attractive magnetic force exists between the first component 41 and the spacer component 43. The magnet 431 and/or the ferromagnetic material 411 is configured such that the magnetic force is strong enough to retain the spacer component 43 in contact with the first interface surface 44 in the absence of any other retaining mechanism. However; the magnetic force is weak enough to enable the spacer component 43 to be easily pivoted relative to the first component 41 when the spacer component 43 is retained on the first component 41 by the magnetic force. In particular, the magnetic force is stronger than the force of gravity acting on the spacer component 43, so that during a process of forming the assembly 4 the spacer component 43 can be retained on the first component 41 without any external support. The magnetic features of the third example assembly 4 (that is, the magnet 431 and the ferromagnetic material 411) may be incorporated into any other example assembly according to the invention, including the example assemblies 1, 2, 5 and 6 described herein.

Figure 5A:
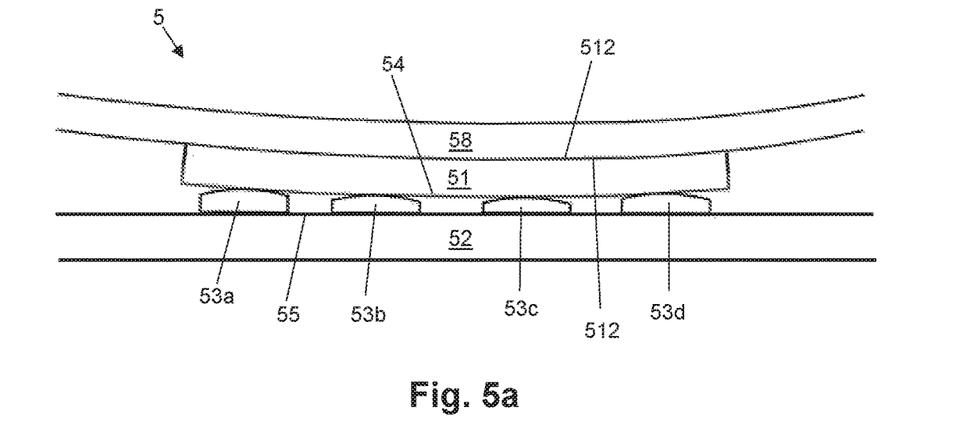
FIG. 5a is a schematic cross-section through a further example assembly according to the invention.

FIG. 5a is a cross-section through a fourth example assembly 5 according to the invention. The assembly 5 comprises a first component 51 having a first interface surface 54, a second component 52 having a second interface surface 55, and a plurality of spacer components 53a-d. These elements of the fourth example assembly 5 are substantially the same as the corresponding elements of the example assembly 2, except for the differences that are explicitly described below.

The fourth example assembly 5 further comprises a third component 58. The third component 58 is connected to the second component 52 (by any known connection mechanism) such that the first component 51 is between the third component 58 and the second component 52. In this example the first component 51 comprises an interface plate. The first component 51 comprises a further surface 512 opposite to the first interface surface 54. The further surface 512 is configured to match a surface of the third component 58 which faces the first component 51. In some examples substantially the entire further surface 512 of the first component (interface plate) 51 is in contact with the third component 58. The third component 58 may be comprised in an aircraft structure, such as an aircraft wing. The second component 52 may also be comprised in an aircraft structure, such as an aircraft engine mounting pylon. The first component (interface plate) 51 may be formed from a different material to the third component 58. In particular, the first component (interface plate) 51 may be stronger and/or more wear-resistant than the third component 58.

The first interface surface 54 is curved, whereas the second interface surface 55 is substantially flat. A gap between the first component (interface plate) 51 and the second component 52 is therefore wider near the edges of the first component (interface plate) 51 than near the centre of the first component 51. The spacer components 53a-d are distributed across the width of the first component (interface plate) 51, such that the spacer components 53a and 53d are disposed relatively near to the edges of the first component (interface plate) 51 and the spacer components 53b and 53c are disposed relatively near to the centre of the first component (interface plate) 51.

Figure 5B:
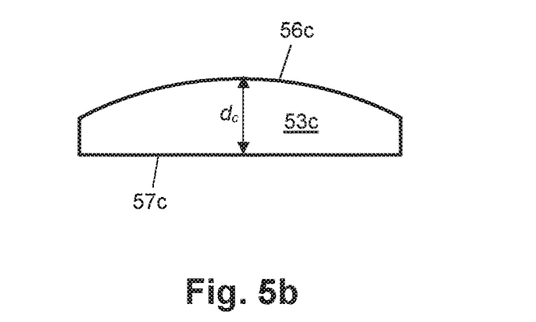

FIG. 5b is a cross-section through the spacer component 53c. The spacer component 53c has a part-spherical upper surface 56c and a substantially flat lower surface 57c. The spacer component 53c may be considered to comprise an upper part-spherical portion and a lower cylindrical portion. The spacer component 53c has a thickness $d_c$ which is the largest distance between the upper surface 56c and the lower surface 57c. The other spacer components 53a, 53b, 53d have the same general configuration (that is, a part spherical upper portion and a cylindrical lower portion). In order that each spacer component 53a-d is in contact with both the first interface surface 54 and the second interface surface 55, the thickness of each spacer component 53a-d is selected depending on the width of the gap between the first component (interface plate) 51 and the second component 52 at the intended location of that spacer component. Thus, in the illustrated example the outer spacer components 53a, 53d have a greater thickness d than the inner spacer components 53b, 53c. In some examples the thickness d of each spacer component is different to the thickness d of each other spacer component in the assembly 5. In some examples two or more spacer components 53a-d may have the same thickness d. The thickness of the spacer components 53a-d is varied by varying the height of the cylindrical portion.

Figure 6:
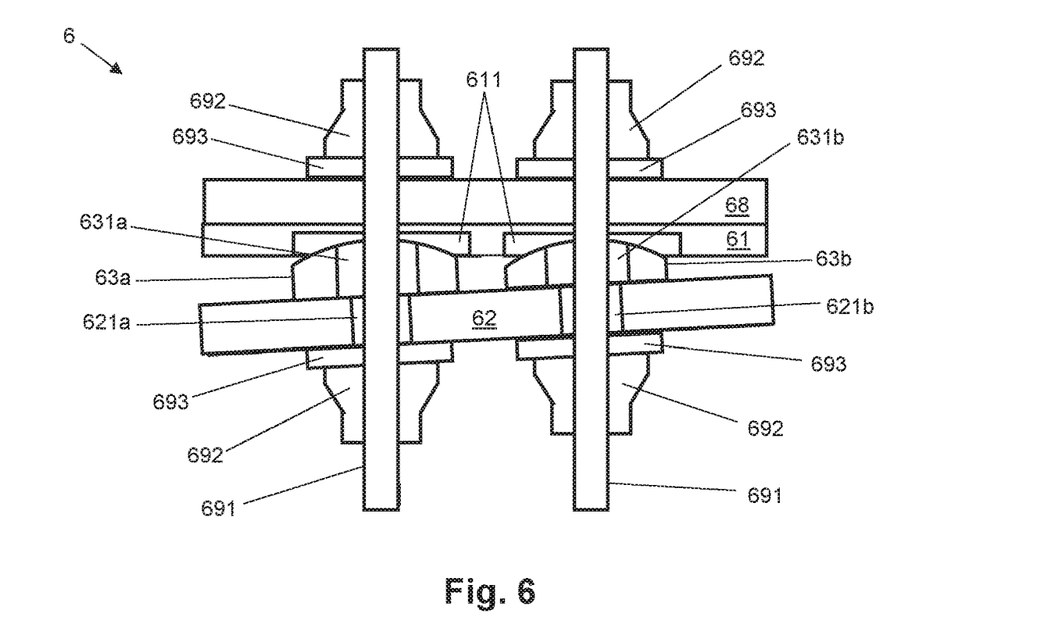
FIG. 6 is a schematic cross-section through a further example assembly according to the invention.

FIG. 6 is a cross-section through a fifth example assembly 6 according to the invention. The assembly 6 comprises a first component 61 having a first interface surface, a second component 62 having a second interface surface, a third component 68, and a pair of spacer components 63a, 63b. These elements of the assembly 6 have the same features as the corresponding elements of the example assembly 5, except where explicitly described otherwise below.

The third component 68 is comprised in a first aircraft structure, the second component 62 is comprised in a second aircraft structure, and the first component 61 comprises an interface plate mounted on the first aircraft structure 68. The first aircraft structure and the first component 61 are both curved (in particular, the interface plate 61 is configured to match the curvature of the first aircraft structure) whilst the second aircraft structure is substantially flat. As a consequence, the first and third components 61, 68 are angled with respect to the second component 62. A gap between the first component 61 and the second component 62 is therefore wider at the left-hand end of the assembly 6 (with respect to the illustrated orientation) than at the right-hand end of the assembly 6. The thickness of the left-hand spacer component 631a is accordingly greater than the thickness of the right-hand spacer component 631b.

The first component 61 comprises two portions of ferromagnetic material 611, which form the regions of the first interface surface that are in contact with the spacer components 631a, 631b. Each of the spacer components 63a, 63b comprises a magnet, such that an attractive magnetic force exists between the first component 61 and each of the spacer components 63a, 63b. The portions of ferromagnetic material 611 and magnets of the example assembly 6 may have any of the features of the corresponding elements of the example assembly 4 described above.

The third component 68 is connected to the second component 62 by a pair of fasteners. In the illustrated example each fastener comprises a tension stud 691 having threaded ends. A threaded nut 692 is engaged with each threaded end of the stud 691, and a washer 693 is provided between each nut 692 and the adjacent component. The washers 693 are spherical washers, so that one or both of the second component 62 and the third component 68 need not be perpendicular to the stud axis. In the illustrated example the third component 68 is substantially perpendicular to the stud axis and the second component 62 is not perpendicular to the stud axis. The studs 691, nuts 692 and washers 693 are arranged in a conventional manner to prevent axial separation of the third component 68 and the second component 62. Each stud 691 passes through one of the spacer components 63a, 63b and through the first component 61, as well as through the second component 62 and the third component 68.

Each of the spacer components 63a, 63b comprises a pre-drilled fastener hole 621a, 621b. The diameter of the fastener holes 631a, 631b is larger than the diameter of the studs 691, to permit the spacer components 63a, 63b to be at an angle to the studs 691 (that is, the flat lower surface of the spacer components is not perpendicular to the long axes of the studs). The greater the difference in diameter of the fastener holes 631a, 631b and the studs 691, the greater the permitted angle between the spacer components 63a, 63b and the studs 691. Similarly, the second component 62 comprises two pre-drilled fastener holes 621a, 621b, in predetermined locations. The diameter of the fastener holes 621a, 621b is larger than the diameter of the studs 691, to permit the second component 62 to be at an angle relative to the studs 691 (that is, the plane of the second component is not perpendicular to the long axes of the studs).

The first component 61 and the third component 68 also comprise a pair of fastener holes. These fastener holes have substantially the same diameter as the studs 691. These fastener holes may be pre-drilled or may be drilled at the time of installing the studs 691. The fastener holes in the first and third components 61, 68 are created so as to be substantially perpendicular to the top surface of the third component 68, so it is not necessary for them to have a larger diameter than the studs 691.

Figure 7:
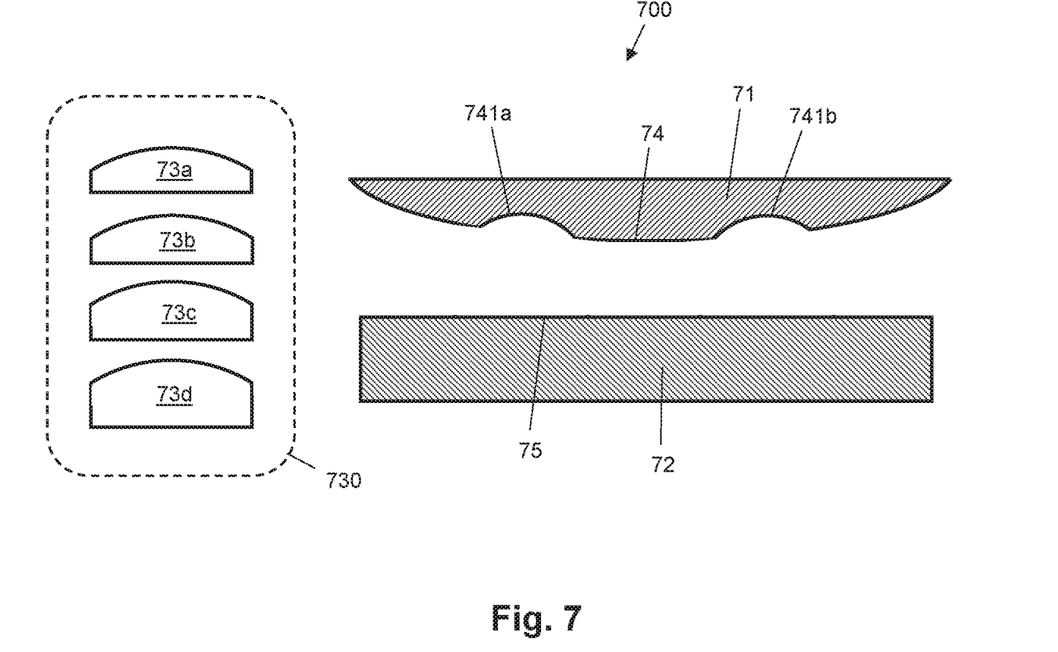
FIG. 7 is a schematic side view of an example kit of parts for forming an assembly according to the invention.

Any example assembly according to the invention, including the particular example assemblies 1, 2, 4, 5, 6 described above, may be formed from a kit of parts. FIG. 7 shows an example kit of parts 700 for forming a joint. The kit of parts 700 may be used to form an assembly according to the invention. The kit of parts 700 comprises a first structure 71 having a first surface 74 and a second structure 72 having a second surface 75. The shape of the second surface 75 does not match the shape of the first surface 74. In the particular example, the second surface 75 is substantially flat, whereas the first surface 74 is curved. The first structure 71 may comprise a first component according to any of the above-described examples and the second structure 72 may comprise a second component according to any of the above-described examples.

The kit of parts 700 further comprises at least one intermediary element 73a-d. In the illustrated example, the kit of parts 700 comprises a plurality of intermediary elements 73a-d. Each of the intermediary elements 73a-d has a first side configured to contact the first surface 74 and a second side configured to contact the second surface 75. A distance between the first side and the second side is different for each intermediary element 73a-d of the plurality—in other words, each intermediary element 73a-d has different thickness. Each intermediary element 73a-d may comprise a spacer component according to any of the above-described examples.

The first side of each intermediary element 73a-d and/or the first surface 74 is configured such that relative pivoting of each intermediary element 73a-d and the first structure 71 is permitted. This may be achieved by the intermediary elements 73a-d and/or the first surface 74 having the features of any of the example spacer components and first interface surfaces described above which have the function of permitting relative pivoting therebetween. In the illustrated example, the kit of parts 700 is configured to form a joint in which a selected two of the intermediary elements 73a-d are disposed between the first structure 71 and the second structure 72. The first surface 74 comprises two regions 741a and 741b, which are recessed, and which are intended to contact the first sides of the selected intermediary elements 73a-d. In the illustrated example, in order to enable the relative pivoting, each of the two contact regions 741a, 741b comprises a concave part-spherical surface, and the first side of each intermediary element 73a-d comprises a convex part-spherical surface of matching curvature.

The second side of each intermediary element 73a-d is configured such that relative pivoting of each intermediary element 73a-d and the second structure, about any axis parallel to the second surface, is substantially prevented when the second side of each intermediary element 73a-d is adjacent the second surface. In the illustrated example the second surface 75 is substantially flat, and the second side of the each intermediary element 73a-d is also substantially flat. Thus, when the second side is adjacent the second surface 75, only rotational movement about an axis perpendicular to the second surface 75 is possible.

Each of the intermediary elements 73a-d in the plurality has the same general shape, but differs in thickness (that is, the maximum distance between the first side and the second side). The intermediary elements 73a-d in the illustrated example have the same design as the example spacer components 53a-d described above. Preferably the thicknesses of the intermediary elements 73a-d are evenly spaced along a range, with the difference between adjacent thicknesses in the range being small. The smaller the differences in thickness between adjacent intermediary elements in the range, the more likely it is that one of the intermediary elements 73a-d will match a desired gap between the first and second structures without needing to be modified. This may also become more likely if the number of different thickness intermediary elements in the plurality is increased.

To form the kit of parts 700 into a joint, only two of the intermediary elements 73a-73d would be used. The two intermediary elements 73a, 73d that are selected to form part of the joint will generally be the two that have thicknesses which most closely match the width of a gap between the first surface 74 and the second surface 75 when the first and second structures 71, 72 are arranged in an intended final relative position and orientation. The number of intermediary elements that form part of a final joint may vary depending on the particular application. However; it will generally be advantageous for a kit of parts according to the invention to comprise a significantly larger number of differently-sized intermediary elements than the number of intermediary elements intended to be comprised in the final joint.

Figure 8:
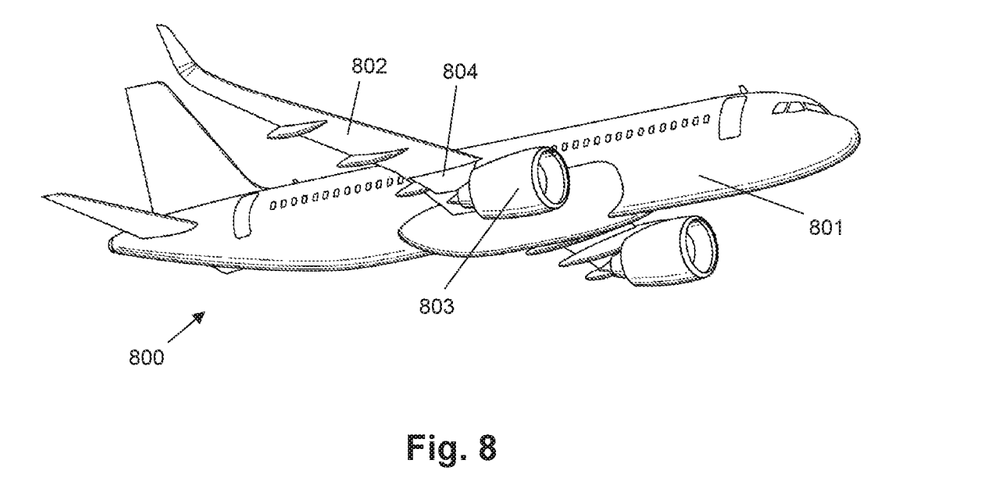
FIG. 8 is a perspective view of an example aircraft comprising an assembly according to the invention.

FIG. 8 shows an example aircraft 800 which comprises one or more assemblies according to the invention. In particular, the aircraft 800 comprises a fuselage 801, and a wing 802, to which an engine mounting pylon 804 is attached. An engine 803, which may for example be an Ultra-High-Bypass Ratio (UHBR) engine, is mounted on the engine mounting pylon 804. The engine mounting pylon 804 is close-coupled to the wing 802. A joint between the engine mounting pylon 804 and the wing 802 comprises an example assembly according to the invention (e.g. any of the example assemblies 1, 2, 4, 5, 6 described above). The aircraft 800 also includes a further wing, engine mounting pylon and engine. The further wing and engine mounting pylon may be connected in the same manner as the wing 802 and pylon 804.

The aircraft 800 may also include one or more further assemblies according to the invention, which may connect together aircraft structures other than pylons and wings.

Figure 9:
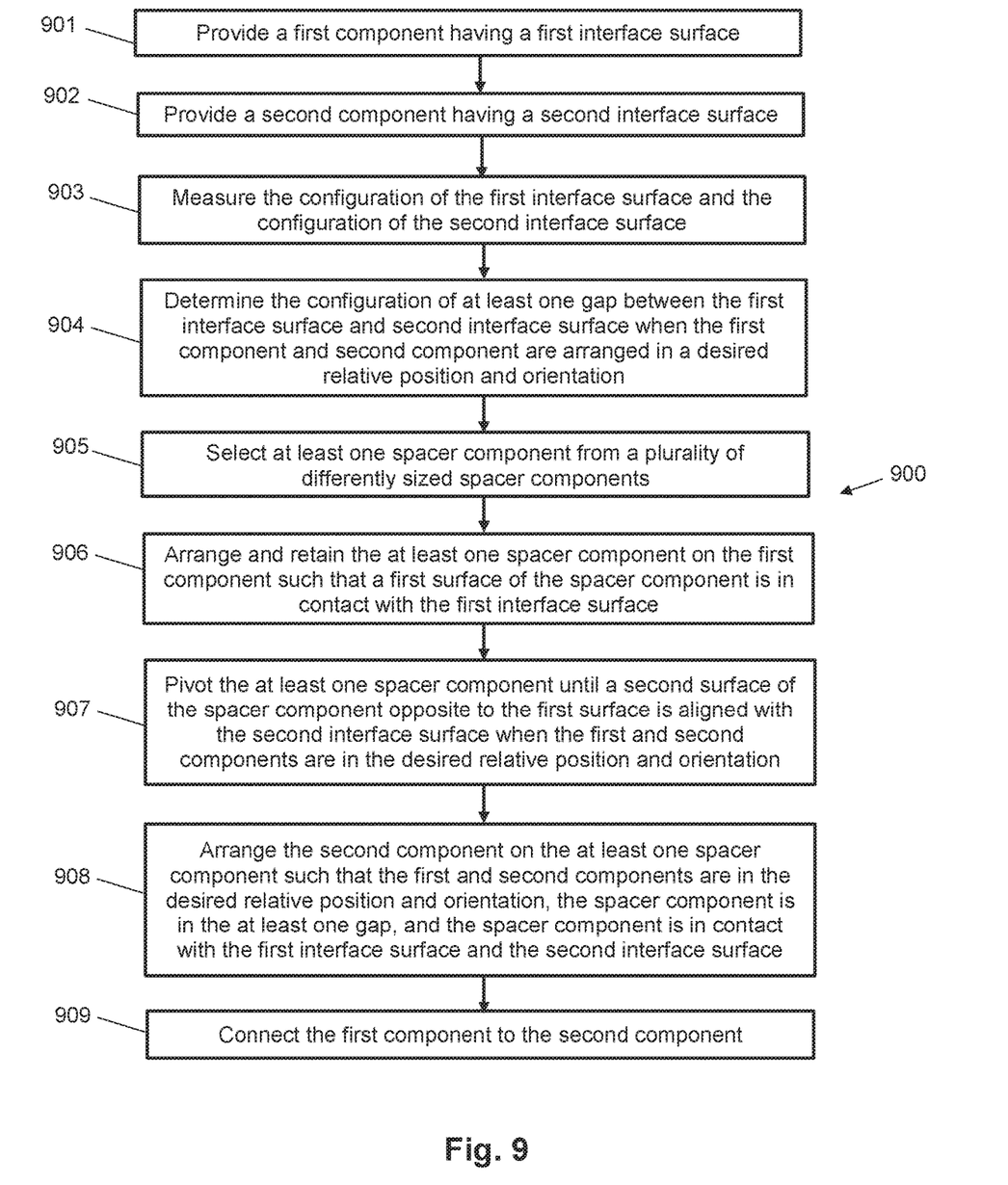
FIG. 9 is a flow chart of an example method according to the invention.

FIG. 9 is a flow chart illustrating a method 900 of joining a first component to a second component in a predetermined relative position and orientation of the first and second components. The first component may be a first component or a third component according to any of the above described examples. The second component may be a second component according to any of the above described examples. Performing the method may result in the formation of an assembly according to the invention, such as any of the example assemblies described above. The method may be performed using a kit of parts according to the invention, such as the example kit of parts 700.

In a first block 901, a first component having a first interface surface is provided. The first component may be, for example, any of the example first components 11, 21, 41, 51, 61. In some examples the first component may be provided pre-attached to a further component, such as any of the example third components 58, 68.

In block 902, a second component having a second interface surface is provided. The curvature of the second interface surface is different to the curvature of the first interface surface. The second component may be, for example, any of the example second components 12, 22, 42, 52, 62.

In a third block 903, the configuration of the first interface surface and the configuration of the second interface surface are measured. Preferably the measuring is done with a high level of accuracy. For example, the configurations of the first interface surface and the second interface surface may be measured to an accuracy of at least 100 µm. The measuring may be performed using any suitable techniques, such as 3D point cloud scanning or physical metrology. The first component and the second component need not be arranged in a desired final relative position and orientation during the measuring. Instead, the configuration of the first interface surface may be measured in a separate process to the measuring of the configuration of the second interface surface, and the two measuring processes may be performed at different times and/or locations. In some examples, the configuration of one or both of the first interface surface and the second interface surface may be measured relative to a fixed tooling datum.

In a fourth block 904, the configuration of at least one gap between the first interface surface and the second interface surface when the first component and the second component are arranged in a desired relative position and orientation is determined, based on the results of the measuring. In the desired relative position and orientation, the second interface surface faces the first interface surface. Due to the differing curvatures of the second interface surface and the first interface surface, the thickness of the gap varies across the area of the first interface surface (and the second interface surface). Performing block 904 may comprise a first step of calculating a nominal gap configuration, e.g. using a computer-aided design software. This first step may be performed without the first component and the second component being physically arranged in the desired relative position and orientation. A second step of determining how the actual gap configuration differs from the nominal gap configuration may then be performed when the first component and the second component are physically arranged in the desired relative position and orientation, using any suitable measuring technique. The nominal gap configuration may be updated to provide a final gap configuration, based on the results of the second step.

In a fifth block 905, at least one spacer component is selected from a plurality of differently sized spacer components, based on the results of the determining. In some examples the at least one spacer component is selected based on a final gap configuration determined in block 904. The plurality of spacer components may each have substantially the same configuration, but different thicknesses. Each spacer component in the plurality may be, for example, a spacer component according to any of the examples described above.

The spacer component may be selected such that the thickness of the spacer component is equal or substantially equal to the width of the gap at the intended location of the spacer component. In some examples, selecting a spacer component from a plurality of differently sized spacer components may comprise selecting a spacer component having a thickness that is closest to being equal to the width of the gap at the intended location of the spacer component. In some examples, selecting a spacer component may comprise selecting a spacer component having a thickness larger than the width of the gap at the intended location of the spacer component. In such examples, the thickness of the selected spacer component may be reduced to equal the thickness of the gap, e.g. by machining the selected spacer component, before the performance of block 906. In examples where it is intended to use a plurality of spacer components, block 905 is performed in respect of each of the plurality of spacer components.

In block 906, the at least one spacer component is arranged and retained on the first component such that a first surface of the spacer component is in contact with the first interface surface. Arranging the at least one spacer component may comprise positioning the at least one spacer component relative to the first component such that a fastener hole in the spacer component is aligned with an intended fastener location on the first component. Arranging and retaining the at least one spacer component may comprise engaging a retention mechanism to resist separation of the spacer component and the first component. The retention mechanism permits pivoting of the spacer component relative to the first component. In examples in which one of the spacer component and the first component comprises a magnet and the other one comprises a ferromagnetic material, the magnet may be positioned close to or in contact with the ferromagnetic material. In such examples the retention mechanism comprises an attractive magnetic force between the spacer component and the first component.

In block 907 the at least one spacer component is pivoted until a second surface of the spacer component opposite the first surface is aligned with the second interface surface, when the second component is in the desired position and orientation. The pivoting movement may be driven manually. The pivoting movement may happen as a consequence of the second component being arranged on the spacer component in the desired relative position and orientation (block 908). That is, as the second component is brought into contact with the spacer component and is moved to the desired position and orientation, if the second surface of the spacer component is not already in the correct pivotal position, the second interface surface will push on a part of the spacer component and thereby cause the pivotal position of the spacer component to change until its second surface is aligned with the second interface surface.

In block 908 the second component is arranged on the at least one spacer component such that the first component and the second component are in the desired relative position and orientation, the spacer component is in the at least one gap, and the spacer component is in contact with the first interface surface and the second interface surface. As discussed above, the arranging of the second component on the at least one spacer component may cause the pivoting of the spacer component that is the subject of block 907. Blocks 907 and 908 may therefore occur simultaneously. Arranging the second component on the at least one spacer component may comprise supporting and moving the second component into the desired relative position and orientation. This can be achieved in any suitable manner, e.g. using a jig. The first component may be maintained in a fixed position and orientation during the performance of block 908, e.g. using a jig or any other suitable assembly equipment.

In block 909, the first component is connected to the second component. Any suitable known technique may be used to perform the connection. For example, connecting the first component to the second component may comprise fastening the first component to the second component. Such fastening may comprise installing one or more fasteners into bores extending through the first component and the second component. In some examples, one such fastener may additionally extend through the spacer component. Where multiple spacer components are present, a fastener may extend through each spacer component. In examples where the first component is attached to a further component, such as any of the example third components 58, 68, the fastener may additionally extend through the further component. At least some sections of the fastener bores may be pre-drilled before the components of the assembly have been brought together in a desired final configuration in block 908. Some sections of the fastener bores may be drilled as part of performing block 909, after the components of the assembly have been brought together in the desired final configuration.

Although the invention has been described above with reference to one or more preferred examples or embodiments, it will be appreciated that various changes or modifications may be made without departing from the scope of the invention as defined in the appended claims.

Where the term "or" has been used in the preceding description, this term should be understood to mean "and/or", except where explicitly stated otherwise.

The invention claimed is:

1. An aircraft assembly comprising:
   a first component having a first interface surface;
   a second component having a second interface surface with a curvature, wherein the second component is connected to the first component by at least one fastener such that the second interface surfaces faces the first interface surface;
   a spacer component disposed between the first interface surface and the second interface surface and configured to be pivotable relative to the first interface surface;
   a magnetic attachment mechanism configured to retain the spacer component in contact with the first interface surface in the absence of any other retaining mechanism;
   wherein one of the first component and the spacer component comprises a magnet and the other one of the first component and the spacer component comprises a ferromagnetic material, such that an attractive magnetic force exists between the first component and the spacer component; and
   wherein the at least one fastener comprises a tension bolt and extends through the first component, the second component, and the spacer component; and
   wherein the first interface surfaces is curved and the second interface surface is substantially flat, and wherein the spacer component has a substantially flat surface in contact with a region on the second interface surface, wherein the first component and the second component are angled relative to one another, and the magnitude of the gap between the first component and the second component is proportional to the angle between the first component and second component.

2. The assembly according to claim 1, wherein the spacer component is configured to be pivotable about at least two orthogonal axes relative to the first interface surface.

3. The assembly according to claim 2, wherein the spacer component has a convex part-spherical surface in contact with a region on the first interface surface.

4. The assembly according to claim 3, wherein the region on the first interface surface is concave part-spherical and is configured to match the convex part-spherical surface of the spacer component.

5. The assembly according to claim 1, wherein the magnet and/or the ferromagnetic material is configured such that the magnetic force is strong enough to retain the spacer component in contact with the first interface surface in the absence of any other retaining mechanism.

6. The assembly according to claim 1, wherein a region of the first interface surface in contact with the spacer component comprises a magnet or a ferromagnetic material, and at least one further region of the first interface surface comprises a non-magnetic material.

7. The assembly according to claim 1, comprising a second spacer component disposed between the first interface surface and the second interface surface.

8. The assembly according to claim 7, wherein the spacer component and the second spacer component have substantially the same shape, but different thicknesses.

9. The assembly according to claim 1, further comprising a third component connected to the second component such that the first component is between the third component and the second component, wherein the first component comprises an interface plate having a further surface opposite to the first interface surface, the further surface being configured to match a surface of the third component which faces the first component.

10. The assembly according to claim 9, wherein the third component is comprised in a first aircraft structure and the second component is comprised in a second aircraft structure.

11. The assembly according to claim 10, wherein the first aircraft structure is a wing and the second aircraft structure is an engine mounting pylon.

12. An aircraft comprising the assembly of claim 1.

13. A method of joining a first component to a second component in a predetermined relative position and orientation of the first and second components, the method comprising:
   providing a first component having a first interface surface;
   providing a second component having a second interface surface;
   measuring the configuration of the first interface surface and the configuration of the second interface surface;
   determining the configuration of at least one gap between the first interface surface and the second interface surface when the first component and the second component are arranged in a desired relative position and orientation, based on the results of the measuring;
   selecting at least one spacer component from a plurality of differently sized spacer components, based on the results of the determining;
   arranging and retaining the at least one spacer component on the first component such that a first surface of the spacer component is in contact with the first interface surface;
   pivoting the at least one spacer component until a second surface of the spacer component opposite the first surface is aligned with the second interface surface when the second component is in the desired position and orientation;
   arranging the second component on the at least one spacer component such that the first component and the second component are in the desired relative position and orientation, the spacer component is in the at least one gap, and the spacer component is in contact with the first interface surface and the second interface surface; and
   connecting the first component to the second component by a fastener comprising a tension bolt and extending through the first component, the second component, and the at least one spacer
   wherein the first interface surfaces is curved and the second interface surface is substantially flat, and wherein the spacer component has a substantially flat surface in contact with a region on the second interface surface, wherein the first component and the second component are angled relative to one another, and the magnitude of the gap between the first component and the second component is proportional to the angle between the first component and second component.

14. A method according to claim 13, wherein performance of the method results in the formation of an assembly comprising
a first component having a first interface surface;
a second component having a second interface surface with a curvature different to the curvature of the first interface surface, wherein the second component is connected to the first component such that the second interface surfaces faces the first interface surface; a spacer component disposed between the first interface surface and the second interface surface and configured to be pivotable relative to the first interface surface; and,
a magnetic attachment mechanism configured to retain the spacer component in contact with the first interface surface in the absence of any other retaining mechanism;
wherein one of the first component and the spacer component comprises a magnet and the other one of the first component and the spacer component comprises a ferromagnetic material, such that an attractive magnetic force exists between the first component and the spacer component.

* * * * *